United States Patent
Ciabattoni et al.

(10) Patent No.: US 12,524,636 B2
(45) Date of Patent: Jan. 13, 2026

(54) HANDLING RECOGNITION SYSTEM FOR HANDHELD DEVICE

(71) Applicant: Datalogic IP Tech S.R.L., Lippo di Calderara di Reno (IT)

(72) Inventors: Stefano Ciabattoni, Bologna (IT); Davide Gavioli, Modena (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 0 days.

(21) Appl. No.: 18/657,298

(22) Filed: May 7, 2024

(65) Prior Publication Data

US 2025/0348699 A1   Nov. 13, 2025

(51) Int. Cl.
*G06K 7/10* (2006.01)
*G06K 7/14* (2006.01)

(52) U.S. Cl.
CPC ....... *G06K 7/10881* (2013.01); *G06K 7/1413* (2013.01); *G06K 2007/10524* (2013.01)

(58) Field of Classification Search
CPC .. G06K 7/10881; G06K 7/1413; G06K 7/109; G06K 2007/10524; G06K 7/14
USPC ............ 235/462.45, 462.43, 472.01, 462.01
See application file for complete search history.

(56) References Cited

U.S. PATENT DOCUMENTS

| | | | |
|---|---|---|---|
| 2003/0001018 A1* | 1/2003 | Hussey | G06V 30/142 235/472.01 |
| 2007/0057067 A1* | 3/2007 | He | G06K 7/10851 235/462.21 |
| 2010/0183199 A1* | 7/2010 | Smith | H04L 9/3231 707/769 |

FOREIGN PATENT DOCUMENTS

| | | | | |
|---|---|---|---|---|
| CN | 108009457 A | * | 5/2018 | |
| CN | 118511181 A | * | 8/2024 | ............ G01J 1/0233 |
| JP | 2004252907 A | * | 9/2004 | |

* cited by examiner

*Primary Examiner* — Edwyn Labaze
(74) *Attorney, Agent, or Firm* — Shook, Hardy & Bacon L.L.P.

(57) ABSTRACT

The technology disclosed herein relates to a handheld scanning device and associated methods and media. The handheld scanning device has an optical sensor positioned under at least a portion of a back side of a handle, such that a wavelength can pass through at least the portion of the handle. For example, this portion of the handle can be translucent or transparent. In some embodiments, one or more processors of the handheld scanning device can determine, using the optical sensor, that the handheld scanning device is to transition to an operating or idle state. In embodiments, the handheld scanning device may have a battery and a battery indicator capable of emitting a visible light through a portion of the handle to indicate a state of the battery.

20 Claims, 6 Drawing Sheets

HANDLING RECOGNITION SYSTEM FOR HANDHELD DEVICE

BACKGROUND

Handheld scanning devices can be used in a wide range of applications. For example, barcode scanners are regularly used in connection with checkout stations at supermarkets or other retail establishments for reading barcodes on consumer goods. Barcode scanners can be useful in inventory collection and control for warehousing, shipping, and storage of products.

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with components, methods, systems, and media for a handling recognition system for a handheld device, substantially as shown in and/or described in connection with at least one of the figures, and as set forth more completely in the claims.

In embodiments, a handheld scanning device can include an optical sensor positioned within a handle, under at least a portion of an external back side of the handle of the handheld scanning device. The portion of the external back side of the handle can allow wavelengths to pass through the external back side of the handle. In some embodiments, for example, one or more processors of the handheld scanning device can be communicatively coupled with the optical sensor for determining whether the handheld scanning device is to transition to an operating state, or for determining whether the handheld scanning device is to transition to an idle state. For instance, based on the one or more processors determining that the handheld scanning device is in an operating state or is to transition to the operating state, the one or more processors can set the reader in the operating mode by enabling all needed functions (here after indicated as scanning operations) for scanning and decoding an optical code (e.g., wake-up the processor, switch-on the sensor and the aimer of the handheld scanning device). As another illustration, based on the one or more processors determining that the handheld scanning device is to transition to the idle state, the one or more processors can disable one or more of the scanning operations of the handheld scanning device.

In some embodiments, one or more processors of the handheld scanning device can be communicatively coupled with one or more batteries or battery indicators of the handheld scanning device. By way of illustration, the battery indicator may be positioned within the handle under a portion of the external back side of the handle, such that a visible light from the battery indicator can pass through this portion of the handle. In this way, based on the one or more processors detecting a state of the battery, the battery indicator can emit the visible light through the back side of the handle to indicate the detected state of the battery. In embodiments, one or more battery indicators or one or more optical sensors can be positioned on other parts within the handle having one or more external portions in which wavelengths (e.g., from the optical sensor(s)) can pass through (e.g., transparent or translucent external portion(s) of the handle). Each of the one or more battery indicators or one or more optical sensors can be aligned with one or more of these external portion(s) of the handle.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
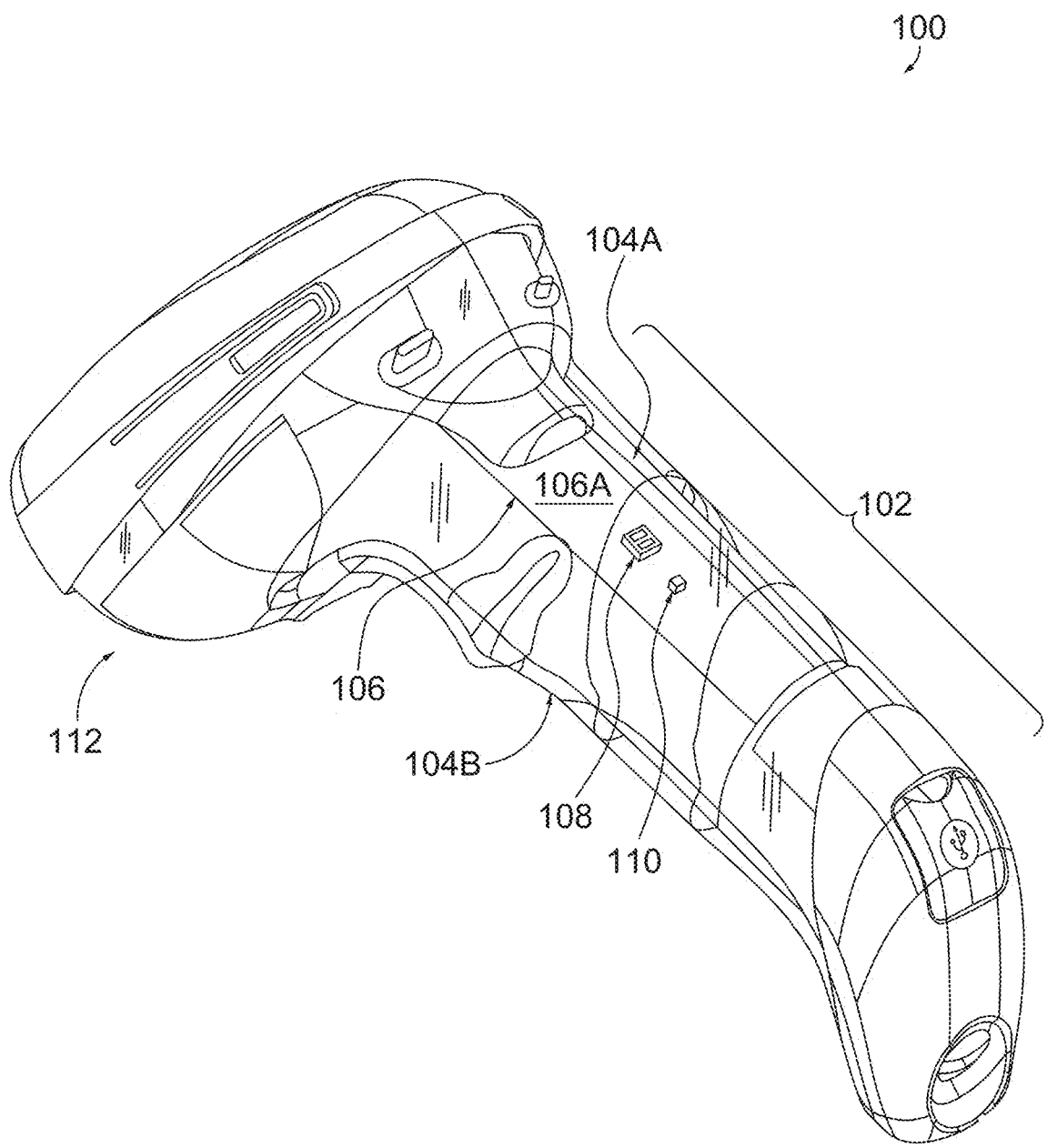
FIGS. 1-2 depict an example of the handheld scanning device having the optical sensor and wavelength-penetrable portion of the handle, in accordance with embodiments herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies.

TERMS

Although the terms "step" and/or "block" may be used herein to connote different elements of methods employed, the terms should not be interpreted as implying any particular order among or between various steps herein disclosed unless and except when the order of individual steps is explicitly described.

In addition, words such as "a" and "an," unless otherwise indicated to the contrary, may also include the plural as well as the singular. Thus, for example, the constraint of "a feature" is satisfied where one or more features are present.

Furthermore, the term "or" includes the conjunctive, the disjunctive, and both (a or b thus includes either a or b, as well as a and b).

"Computer storage media" does not comprise signals per se.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more." The term "plurality" may refer to "more than one."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

Additionally, a "handheld scanning device," as used herein, is a portable electronic device capable of capturing and processing data. For example, a handheld scanning device may be capable of converting captured analog data or another type of data into digital data, processing captured barcode data (e.g., parallel lines, rectangular shapes, patterned dots), decoding captured sensor data, converting captured three-dimensional image data into digital data, among other types of capabilities or functionalities. As another example, a scanner of the handheld scanning device may include a laser and sensor capable of detecting a reflection from the laser, an image sensor (e.g., capable of extracting QR codes), or another type of scanning technology. In some embodiments, the handheld scanning device may include one or more processors capable of utilizing one or more decoding algorithms, one or more transmitters or receivers for Bluetooth or Wi-Fi capabilities, one or more stored software media operations for inventory management or point-of-sale operations, etc.

The term "optical sensor" refers to a device that can detect and measure a wavelength (e.g., visible light) for object detection (e.g., detection of a human hand gripping the handle of the handheld scanning device). For example, an optical sensor may have one or more transmitters, one or more receivers, or a combination thereof. In embodiments, an optical sensor may be a photodiode or semiconducting device that can convert wavelengths to an electrical current, a phototransistor that can amplify generated current, an infrared (IR) sensor (e.g., a passive IR sensor that can detect heat from the human hand gripping the handle of the handheld scanning device, an active IR sensor that can detect IR wavelength reflections from the human hand gripping the handle of the handheld scanning device), a time-of-flight sensor, a light detection and ranging sensor, a fiber optics sensor, another type of optical sensor, or one or more combinations thereof.

The term "battery indicator" refers to an indicator capable of providing information associated with a charge level remaining for a corresponding battery. In embodiments, a battery indicator may be a light emitting diode (LED) indicator that indicates a charge level by an illuminated number of LEDs. In some embodiments, the battery indicator may indicate the charge level by illumination of a particular color or by illumination of a particular color in a particular pattern. In embodiments, a battery indicator may indicate the state of the battery (e.g., charge level) via a measured the voltage output of the battery. In some embodiments, the battery indicator may indicate the state of charge of the battery, state of health of the battery (e.g., corresponding to the remaining life of the battery), or both. In some embodiments, the battery and battery indicator can be communicatively coupled to one or more processors of the handheld scanning device to provide the handheld scanning device with real-time battery data.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to random access memory (RAM), read only memory (ROM), electrically erasable programmable read only memory (EEPROM), flash memory or other memory technology, compact disc ROM (CD-ROM), digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Overview

By way of background, scanning devices such as barcode scanning devices have improperly detected, or have not been able to detect, when the scanning device is actually being used in contrast to when the scanning device is merely being transported or moved to a different location without the need for utilizing the scanning operations of the scanning device. In general, scanning devices are mobile devices powered by a battery cell. It is desirable to optimize or preserve the usage of the battery cell to enhance the duration of the battery life. For scanning devices, duration can be measured as number of scans that can be used with a full battery charge.

Previous scanning device solutions to these issues have involved the inclusion of multiple capacitive buttons on the scanning device, making it more tedious on the user to initiate the scanning operations of the scanning device and more strenuous for the user to handle. As another example, some conventional scanning devices have relied solely upon an accelerometer to detect movement of the scanning device, and this approach does not provide the technical capability of distinguishing actual usage of the scanning device with mere transportation or movement to another location without the need for scanning operation utilization. In yet another example, some conventional scanning devices have relied upon image acquisition components to detect changes in scenery based on the scanning device being moved, but this approach also fails to provide the technical capability to distinguish actual utilization of the scanning device. Furthermore, these previous solutions have resulted in severe battery consumption of the scanning device. For example, the image acquisition components continuously utilize the scanning device battery power.

The present technology discussed herein provides for various improvements over the previous technologies discussed above. For example, the technology discussed herein can accurately detect when the scanning device is actually being used and when the scanning device is merely being transported or moved to another location without the need for implementing the scanning operations of the scanning device. The technology discussed herein can also avoid false detections of scanning device usage, and can also detect a handheld scanning device state or mode (e.g., an operating state in which scanning operations are enabled, an idle state in which scanning operations are disabled, and other types of states) based on the optical sensors of the handheld scanning device described herein. For example, precise detection of the handheld scanning device state or mode can also help to optimize battery consumption by enabling what is really needed in a certain specific situation and at the same time, by disabling what is not needed. In this way, the technology discussed herein can detect different kinds of handling of the handheld scanning device and can also disable or enable one or more scanning operations or activate or deactivate proper handheld scanning device configurations based on the various handling detections, thereby preserving the charging level, the state of charge, and the state of health of the battery.

In an example embodiment, the handheld scanning device comprises an optical sensor positioned within the handle. For example, the handle may have at least a portion of an external part of the handle (e.g., a portion of an external back side of the handle) in which a wavelength transmitted by the optical sensor can pass through, the optical sensor being aligned with the external portion in which the wavelength can pass through, the optical sensor being located within the handle. For example, the optical sensor can be positioned on a surface of printed circuit board (PCB) within an internal portion of the handle, such that a wavelength (e.g., IR) can pass through an external portion of the handle for detecting whether the handheld scanning device is being handled for use of the scanning operations of the handheld scanning device and for detecting a state of the handheld scanning device (e.g., an operating state). By way of illustration, the handheld scanning device can utilize one or more optical sensors within the handle to detect whether the handle of the handheld scanning device is being gripped by a human hand.

In some embodiments, the portion of the handle in which the wavelength can pass through is transparent or translucent. In some embodiments, one or more accelerometers of the handheld scanning device can be used in conjunction with the optical sensor to detect whether the handle of the handheld scanning device is being handled for use of the scanning operations of the handheld scanning device. In some embodiments, one or more optical sensors can additionally or alternatively be positioned on various locations of the internal portion of the handle (e.g., facing a back side of the handle, a front side of the handle, or one or more of two lateral sides of the handle), such that wavelengths can pass through an external portion of the handle for detecting whether the handheld scanning device is being handled for use of the scanning operations. In some embodiments, the distance between the optical sensor and an external portion of the handle, in which the wavelength can pass through, is at least one half of a centimeter.

In some embodiments, one or more processors of the handheld scanning device (e.g., a central processing unit of the handheld scanning device) can determine that the handheld scanning device is to transition to an operating state or that the handheld scanning device is to transition to an idle state based on the one or more optical sensors of the handheld scanning device being positioned under at least an external portion of the handle (e.g., an external back side, an external front side, an external lateral side) and aligned with the external portion such that a wavelength from the one or more optical sensors passes through the external portion of the handle. By way of example, the one or more processors of the handheld scanning device can determine a state of the handheld scanning device (e.g., an idle state, an operating state) based on a photodiode converting wavelengths to an electrical current. In some embodiments, based on the one or more processors determining that the handheld scanning device is to transition to an idle state, the one or more processors can disable one or more scanning operations of the handheld scanning device and disable the power of the handheld scanning device after a threshold period of time. In this way, the technology described herein can conserve battery consumption by the handheld scanning device, thereby preserving the charging level and reducing electrical energy consumption by the handheld scanning device and also preserving the state of health of the battery (i.e. extend the life of the battery).

In some embodiments, referring to industrial application(s), the handheld scanning device can be generally placed over a holder installed on a forklift that is moving around a facility. In some embodiments, referring to health care, manufacturing or logistic application(s), the handheld scanning device can be placed inside a holster worn by a human operator. In these instances, if the handheld scanning device would be equipped only with an accelerometer to detect scanning device movement, the aiming subsystem of the handheld scanning device would remain always turned on while the forklift is moving or while the human operator is walking, even if the scanning device is merely being carried around by the forklift or the human operator while not in use for scanning, which would result in depleting the battery, and could also result in damaging the retinas of those who are in line of sight with the scanner. By addition of the one or more optical sensors described herein, the handheld scanning device will be able to distinguish these scanning device relocation situations (e.g., where the scanning device is not actually being grasped by a human hand), and with the use of these optical sensor(s), the scanning device can perform operations that turn off the aiming system or put the aiming system in a low power configuration, for instance.

TECHNOLOGICAL EMBODIMENTS

FIG. 1 illustrates an example of a handheld scanning device 100. Example handheld scanning device 100 is but one example of a suitable device for the technology and techniques disclosed herein, and is not intended to suggest any limitation as to the scope of use or functionality of the invention. Neither should the handheld scanning device 100 be interpreted as having any dependency or requirement relating to any one or combination of components illustrated. As one example, in other embodiments, the handheld scanning device 100 may have additional optical sensors (e.g., positioned within handle 102).

Example handheld scanning device has a handle 102 and scanning head 112. The scanning head 112 generally includes at least an image-capture device. For example, an image-capture device may include at least an image sensor that is operative to produce signals representing images or video frames. Some non-limiting example of an image sensor may include complementary metal-oxide semiconductor (CMOS)-based sensors, charge-coupled device (CCD)-based sensors, sensors optimized for the visible spectrum, sensors optimized for infrared or near-infrared frequencies, high-dynamic-range (HDR) sensors, monochrome sensors, color sensors, other types of image sensors, or one or more combinations thereof. The scanning head 112 may also include, an aimer projector, illumination sources, optical components, other types of scanning head components, or one or more combinations thereof.

In embodiments, the handle 102 may have an external back side 104A, an external front side 104B, an internal portion 106 having an internal printed circuit board (PCB) surface 106A that faces the external back side 104A of the handle 102, and an optical sensor 108. In embodiments, the external back side 104A and the external front side 104B can form an external enclosure that encloses the internal portion 106 and the optical sensor 108 of the handle 102. In embodiments, the external back side 104A, the external front side 104B, and the external lateral sides 204A and 204B of FIG. 3 can form the external enclosure that encloses the internal portion 106 and the optical sensor 108 of the handle 102. The external enclosure may be wavelength-penetrable, i.e., made of material that a wavelength from the optical sensor 108 can pass through. The external enclosure may have one or more portions that are wavelength-penetrable.

The optical sensor 108 may be positioned within the back side of the handle 102, such that a wavelength from the optical sensor 108 can pass through the external back side 104A of the handle 102. For example, the optical sensor 108 can be positioned such that it can transmit one or more wavelengths through at least an external portion of the handle 102 (e.g., a translucent or transparent external portion). In some embodiments, the optical sensor 108 may be positioned on the PCB located within the handle 102. In some embodiments, at least one surface of the PCB faces the external back side 104A of the handle 102. In some embodiments, optical sensor 108 may be positioned on other locations within the handle 102. In some embodiments, the battery indicator 110 is positioned on the internal PCB surface 106A, such that visible light generated by the battery indicator 110 can pass through the external back side 104A of the handle 102 (or a portion thereof).

In embodiments, the handle 102 has at least a portion of the external back side 104A in which one or more wavelengths from the optical sensor 108 can pass through and return to the optical sensor 108, the optical sensor 108 being positioned within the handle 102 (e.g., under the external back side 104A of the handle 102). The optical sensor 108 can be positioned such that it aligns with a particular wavelength-penetrable portion of the external back side 104A. For example, the optical sensor 108 may be positioned on the internal portion 106 of the handle 102 and facing the external back side 104A of the handle 102. As another example, the optical sensor 108 may be positioned within the handle 102 such that a top portion of the optical sensor 108 faces the external back side 104A of the handle 102 (e.g., such that a wavelength emitter transmits the wavelength towards the external back side 104A of the handle 102). In embodiments, the optical sensor 108 can be positioned on the PCB (e.g., mounted on the internal portion 106 of the handle 102) in a way that allows the emitter and receiver of the optical sensor 108 to be aligned with the portion of the external back side 104A of the handle 102 in which a wavelength from the optical sensor 108 can pass through.

In other embodiments, the optical sensor 108 may be positioned on another location of the internal portion 106 of the handle 102. For example, the optical sensor 108 may be positioned closer to the scanning head 112 than as illustrated in FIG. 1, or such that it is further away from the scanning head 112 than as illustrated in example handheld scanning device 100 of FIG. 1.

In embodiments, the external front side 104B may be wavelength-penetrable or may have at least one portion that is wavelength-penetrable. For example, additionally or alternatively, the optical sensor 108 may be positioned on the internal portion 106 such that a top portion of the optical sensor 108 faces the external front side 104B of the handle 102 (e.g., such that a wavelength emitter of the optical sensor 108 transmits the wavelength towards and through the external front side 104B of the handle 102). Stated differently, one or more optical sensors of the handle 102 may be positioned under at least a portion of the external front side 104B of the handle 102 of the handheld scanning device 100 (e.g., on the internal portion 106), wherein at least the portion of the external front side 104B is of a material in which wavelengths from the one or more optical sensors under at least the portion of the external front side 104B can pass through (e.g., such that this optical sensor(s) is aligned with a portion of the external front side 104B in which a wavelength from this optical sensor(s) can pass through).

In some embodiments, the handheld scanning device 100 may have one or more optical sensors (e.g., including the optical sensor 108) facing both the external back side 104A and the external front side 104B of the handle 102 (e.g., one or more optical sensors facing the external back side 104A and one or more optical sensors facing the external front side 104B so that wavelengths may be transmitted away from the internal portion 106) (e.g., the external back side 104A and the external front side 104B having one or more portions that are wavelength-penetrable). By way of example, with the embodiment of the handheld scanning device 100 having optical sensors positioned on at least two different parts of the internal portion 106 and facing both the external back side 104A and the external front side 104B of the handle 102, the handheld scanning device 100 is able to detect at least two parts of the hand (e.g., palm and finger) surrounding the handle 102, thereby avoiding possible false detections due to the obstruction of something other than the human hand.

In some embodiments, one or more optical sensors of the handle 102 (e.g., the optical sensor 108) may be a photodiode or semiconducting sensor, a phototransistor, an IR sensor (e.g., a passive IR sensor or an active IR sensor), a time-of-flight sensor, a light detection and ranging sensor, a fiber optics sensor, another type of optical sensor, or one or more combinations thereof. In some embodiments, one or more optical sensors of the handle 102 (e.g., the optical sensor 108) may transmit (e.g., via a transmitter or emitter) a wavelength in the visible light spectrum (e.g., 400 nm-700 nm), a wavelength in the near-infrared spectrum (e.g., 700 nm-2,500 nm), a wavelength in the infrared spectrum (e.g., 2,500 nm-25,000 nm), a wavelength in the ultraviolet spectrum (e.g., 10 nm-400 nm), a wavelength in the terahertz range (e.g., 0.1 THz-10 THz), a wavelength in the x-ray range (e.g., 0.1 nm-10 nm), a wavelength in the gamma ray range (e.g., less than 0.01 nm), another wavelength, or one or more combinations thereof. By way of example, the handheld scanning device 100 may have a time-of-flight sensor and an active IR sensor transmitting wavelengths through the external back side 104A and a photodiode transmitting wavelengths through the external front side 104B.

In embodiments, one or more portions of the external portion of the handle 102 (e.g., the external back side 104A, the external front side 104B, both the external back side 104A and the external front side 104B, another part of the external portion of the handle, etc.)—in which one or more wavelengths from an optical sensor on the internal portion 106 (e.g., the optical sensor 108) can pass through—may comprise glass (e.g., silica), acrylic (e.g., poly-methyl methacrylate), polycarbonate, polymer, plastic, silicon rubber, germanium, polyethylene, polypropylene, fluoropolymer, polyvinyl chloride, polyurethane, etc., or one or more combinations thereof. In embodiments, the one or more portions of the handle 102 in which one or more wavelengths from an optical sensor within the handle 102 can pass through may have one or more coatings, such as an anti-reflective coating, a dielectric coating, a hard coating for resistance to scratches or abrasions, etc. In some embodiments, different portions of the handle 102 in which one or more wavelengths from an optical sensor located within the handle 102 can pass through may have different coatings.

In some embodiments, the distance between the optical sensor 108 and at least a wavelength-penetrable external portion (e.g., of the external back side 104A) of the handle 102 is at least one half of a centimeter. For example, the distance between the transmitter or emitter of the optical sensor 108 and the interior surface of the external back side 104A of the handle 102 (facing both the optical sensor 108 and the internal PCB surface 106A) can be at least one half of a centimeter. As another example, the distance in which the wavelength from the optical sensor 108 can travel to pass through the external back side 104A of the handle 102 may be at least one half of a centimeter. In other embodiments, the distance between an optical sensor located on the internal portion 106 and facing the external front side 104B of the handle 102 is at least one half of a centimeter away from the external front side 104B of the handle 102. For example, the distance between this optical sensor and the interior surface of the external front side 104B can be at least one half of a centimeter.

In some embodiments, one or more optical sensors (e.g., optical sensor 108) of the handheld scanning device 100 is a few millimeters in length and a few millimeters in thickness (e.g., 1-2 mm). In some embodiments, one or more of the optical sensors of the handheld scanning device 100 are mounted parallel or perpendicular to the mounting of the corresponding printed circuit board (PCB) for the optical sensor. In embodiments, the optical sensor 108 can be positioned on the PCB in a way that allows the emitter and receiver of the optical sensor 108 to be aligned with the external portion of the handle 102 in which a wavelength from the optical sensor 108 can pass through. In some embodiments, the external portion of the handle 102 in which a wavelength from the optical sensor can pass through can surround the handle 102 to cover both the external front side 104B and the external back side 104A (e.g., surrounding one or more external lateral sides of the handle 102 or surrounding one or more portions of an external lateral side). In some embodiments, the external front side 104B of the handle 102 in which a wavelength from an optical sensor can pass through can be a separate portion of the handle 102 than the external back side 104A of the handle 102 in which a wavelength from another optical sensor can pass through (e.g., separated by material in which wavelengths cannot pass through).

In embodiments, the handheld scanning device 100 may have one or more processors (e.g., a central processing unit (CPU), a microcontroller having a CPU, memory, and peripherals on a chip, a digital signal processor capable of performing decoding tasks, a system-on-chip, an application-specific integrated circuit, a field-programmable gate array capable of implementing parallel processing for decoding tasks or real-time data analysis, a plurality of CPUs configured based on advanced reduced instruction set computer architecture (e.g., including advanced reduced instruction set computer architecture Cortex-M series processors), x86 processors, image signal processors, etc.) that are communicatively coupled with the optical sensor 108. For example, the one or more processors of the handheld scanning device 100 can use the optical sensor 108 for determining various states of the handheld scanning device 100 (e.g., an idle state, an operating state, a transitioning state (e.g., transitioning to the idle state, transitioning to the operating state)).

By way of example, one or more accelerometers of the handheld scanning device 100 can be used for detecting motion of the handheld scanning device 100, an orientation of the handheld scanning device 100, vibration of the handheld scanning device 100, etc., for determining the state of the handheld scanning device 100. For instance, the one or more accelerometers may include a piezoelectric accelerometer (e.g., via electrical charge generation in response to a mechanical vibration for detection of small and high frequency vibration), a micro-electro-mechanical systems accelerometer (e.g., capacitive or piezo-resistive), a capacitive accelerometer (e.g., for detecting static or dynamic acceleration), a piezo-resistive accelerometer (e.g., for detecting resistance due to acceleration-induced strain and vibration monitoring), a tri-axial accelerometer, a digital accelerometer, a linear accelerometer, an inertial measurement unit (e.g., having one or more accelerometers and one or more gyroscopes for linear acceleration and angular velocity detection), a surface micro-machined accelerometer, another type of accelerometer, or one or more combinations thereof.

By way of example, based on determining, using the optical sensor 108 in combination with one or more accelerometers of the handheld scanning device 100, that the handheld scanning device 100 is to transition to an operating state, the one or more processors can enable one or more scanning operations of the scanning head 112. As another example, based on determining, using the optical sensor 108 in combination with the one or more accelerometers of the handheld scanning device 100, that the handheld scanning device 100 is to transition to an idle state, the one or more processors can disable one or more scanning operations of the scanning head 112.

Based on determining the state of the handheld scanning device 100, the one or more processors of the handheld scanning device 100 can enable or disable one or more operations (e.g., scanning operations, decoding operations, functional operations (e.g. radio communication, corded communication), etc.) of the handheld scanning device 100. In some example embodiments, the handheld scanning device 100 can dynamically adjust performance and power efficiency of the handheld scanning device 100, based on determining the state of the handheld scanning device 100, via an application-specific integrated circuit. In some embodiments, the handheld scanning device 100 can dynamically enable and disable decoding tasks or scanning tasks via an application-specific integrated circuit. By way of example, based on determining, using the optical sensor 108, that the handheld scanning device 100 is to transition to an operating state, the one or more processors can enable one or more scanning operations of the scanning head 112. As another example, based on determining, using the optical sensor 108, that the handheld scanning device 100 is to transition to an idle state, the one or more processors can disable one or more scanning operations of the scanning head 112.

Scanning operations may include a variety of different actions. For example, when the scanning device 100 is transitioning from the idle to operating state (e.g., when the optical sensor 108 detects that the scanning device 100 has been grasped), the scanning operations can include one or more of: turn on the image sensor, wake up processor, turn on the aimer projector, etc. For example, when the scanning device 100 is transitioning from the operating to the idle state (e.g., when the optical sensor 108 detects that the scanning device 100 is not held by a user), the scanning operations can include: turn off the image sensor, put the processor in a low power mode, turn off the aimer projector, if also the accelerometer, if present, does not detect any movement, turn on for some seconds the LED of the battery status.

In embodiments, the battery indicator 110 may be positioned under at least a portion of (e.g., the external back side 104A) of the handle 102, such that visible light from the battery indicator 110 can pass through a visible wavelength-penetrable portion (e.g., on the external back side 104A) of the handle 102. For example, the battery indicator 110 may be positioned on or partially within the internal portion 106 of the handle 102. To illustrate, the battery indicator 110 may be positioned on the internal PCB surface 106A that faces the external back side 104A of the handle 102. As another illustration, the battery indicator 110 may be positioned within the internal PCB surface 106A such that a top portion of the battery indicator 110 faces the external back side 104A of the handle 102 (e.g., such that a visible light emitter transmits the visible light towards the external back side 104A of the handle 102). In other embodiments, the battery indicator 110 may be positioned on another location of the internal portion 106 of the handle 102. For example, the battery indicator 110 may be positioned on the internal portion 106 such that it is closer to the scanning head 112, or such that it is further away from the scanning head 112 than as illustrated in example handheld scanning device 100 of FIG. 1. As another example, the battery indicator 110 may be positioned under the external front side 104B, such that it is aligned with a visible wavelength-penetrable portion of the external front side 104B.

In embodiments, the battery indicator 110 can emit the visible light through the external back side 104A of the handle 102 to indicate a state of the battery. For example, the battery indicator 110 can emit a particular color to indicate the state of the battery (e.g., a fully charged state of the battery, a partially charged state of the battery, a near-discharged state of the battery, a charging state (e.g., the battery is currently receiving electrical energy), an idle or standby state of the battery (e.g., the battery is not actively supplying power), or another type of state of the battery). For instance, the battery indicator 110 may emit a first color to indicate that the battery is in a near-discharged state and a second color to indicate that the battery is in a fully charged state. As another illustration, the battery indicator 110 may emit a first color to indicate that the battery is in an idle or standby state and a second color to indicate that the battery is in a charging state. In some embodiments, the battery indicator 110 may emit a particular color to indicate a state of health of the battery. In other embodiments of the handheld scanning device 100, the internal portion 106 of the handheld scanning device 100 may include a plurality of battery indictors that are each capable of transmitting visible light through the external back side 104A of the handle 102.

In an embodiment, the external enclosure (e.g., the external back side 104A and the external front side 104B forming the external enclosure that encloses the internal portion 106 and the optical sensor 108 of the handle 102), or one or more portions thereof, can be partially translucent (e.g., such that a particular wavelength can pass through an area corresponding to a human hand grabbing the handle 102). For example, this translucent potion can also allow for the visible wavelengths from the battery indicator 110 to pass through for the indication of the battery state.

Figure 2:
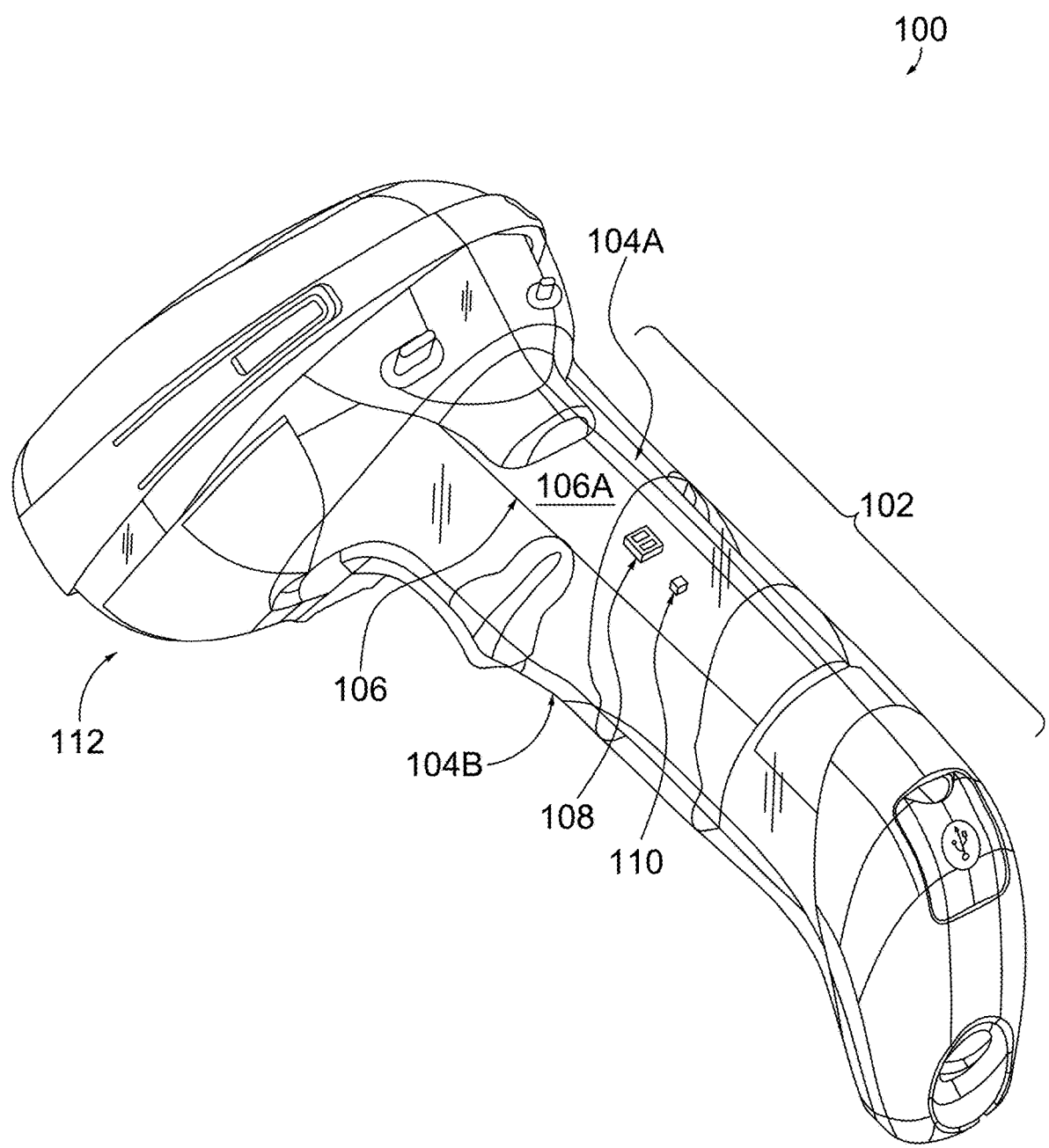

FIG. 2 includes a photographic illustration of the handheld scanning device 100 of FIG. 1. For example, as illustrated in the photographic illustration of FIG. 2, the wavelength-penetrable external back side 104A of the handle 102 extends from a portion of a back end of the scanning head 112 and towards the bottom external back side 104A of the handle 102. Additionally, the wavelength-penetrable external back side 104A of the handle 102 extends above the optical sensor 108 and below the battery indicator 110. Further, the wavelength-penetrable external portion of the handle 102 extends around the external back side 104A of the handle 102 and to the external front side 104B of the handle 102. The wavelength-penetrable external portion of the handle 102 also extends around the two lateral sides of the handle 102 to cover the external front side 104B of the handle 102.

Figure 3:
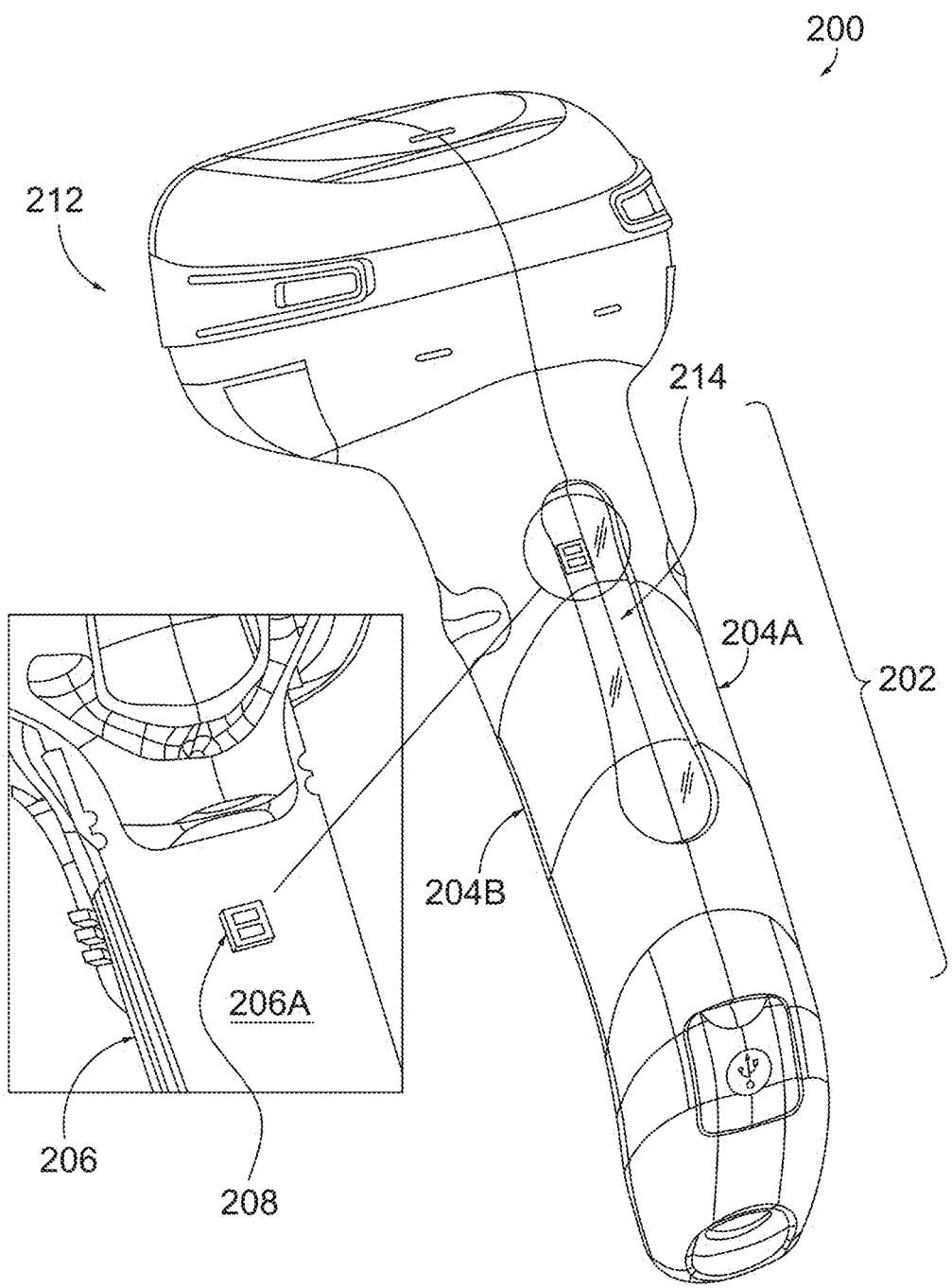
FIG. 3 depicts another example embodiment of the handheld scanning device, in accordance with embodiments herein.

FIG. 3 depicts another example handheld scanning device 200 having a handle 202 and scanning head 212. The handle 202 has an external lateral side 204A and another external lateral side 204B. The handle 202 also has an internal portion 206 having an internal surface 206A that faces a wavelength-penetrable portion 214 of an external back side of the handle 202. Optical sensor 208 is positioned on the internal surface 206A, such that a wavelength from the optical sensor 208 can pass through the wavelength-penetrable portion 214 of an external portion (e.g., of the external back side) of the handle 202. In some embodiments, the internal surface 206A is a PCB.

Example handheld scanning device 200 is but one example of a suitable device for the technology and techniques disclosed herein, and is not intended to suggest any limitation as to the scope of use or functionality of the invention. Neither should the handheld scanning device 200 be interpreted as having any dependency or requirement relating to any one or combination of components illustrated. As one example, in other embodiments, the handheld scanning device 200 may have additional optical sensors (e.g., positioned on the internal portion 206 such that wavelengths from the additional optical sensors can pass through a wavelength-penetrable portion of the external lateral side 204A or the external lateral side 204B of the handle 202).

As illustrated in FIG. 3, the handle 202 has at least a portion of an external back side of the handle in which one or more wavelengths from the optical sensor 208 can pass through, the optical sensor 208 being positioned under the wavelength-penetrable portion 214 of the handle 202 (e.g., on the internal portion 206 of the handle 202, on the surface of a PCB within the handle 202). Stated differently, the optical sensor 208 may be facing a wavelength-penetrable portion of the handle 202. As another example, a wavelength emitter of the optical sensor 208 may transmit one or more wavelengths towards and through the wavelength-penetrable portion 214 of the external back side of the handle 202. In embodiments, the emitter of the optical sensor 208 is at least one half a centimeter away from the wavelength-penetrable portion 214 of the external back side of the handle 202.

In other embodiments, the optical sensor 208 may be positioned on the internal portion 206 such that it is closer to the scanning head 212 or such that it is further away from the scanning head 212 than as illustrated in example handheld scanning device 200 of FIG. 3. In other embodiments, additional optical sensors may be positioned on the internal portion 206, such that the additional optical sensors transmit wavelengths through the external lateral side 204A, the external lateral side 204B, an external front side, or one or more combinations thereof. By way of example, with the embodiment of the handheld scanning device 200 having additional optical sensors facing the external back side and the external lateral side 204A, the external lateral side 204B, the external front side, or one or more combinations thereof, the handheld scanning device 200 is able to detect more than one part of a human hand surrounding or gripping the handle 202, thereby avoiding possible false detections due to the obstruction of something other than the human hand.

Further, in other embodiments, wherein the wavelength-penetrable portion(s) of the handle 202 is at least a portion of the external lateral side 204A, the optical sensor 208 may be positioned on the internal portion 206 such that the optical sensor 208 transmits wavelength(s) through the external lateral side 204A. Additionally or alternatively, wherein the wavelength-penetrable portion(s) include external lateral side 204B, the optical sensor 208 may be positioned on the internal portion 206 such that the optical sensor transmits wavelength(s) through the external lateral side 204B.

In other embodiments, the wavelength-penetrable portion 214 of the external portion of the handle 202 is of a material in which wavelengths from the optical sensor 208 can pass through, and the external wavelength-penetrable portion of the handle 202 surrounds the back side of the handle, a front side of the handle, the external lateral side 204A, and the external lateral side 204B of the handle 202. In other embodiments, the external lateral side 204A and the external lateral side 204B of the handle 202 each have their own separate external wavelength-penetrable portion of the handle 202 (e.g., separated by external portions of the handle 202 in which a particular wavelength cannot pass through).

Figure 4:
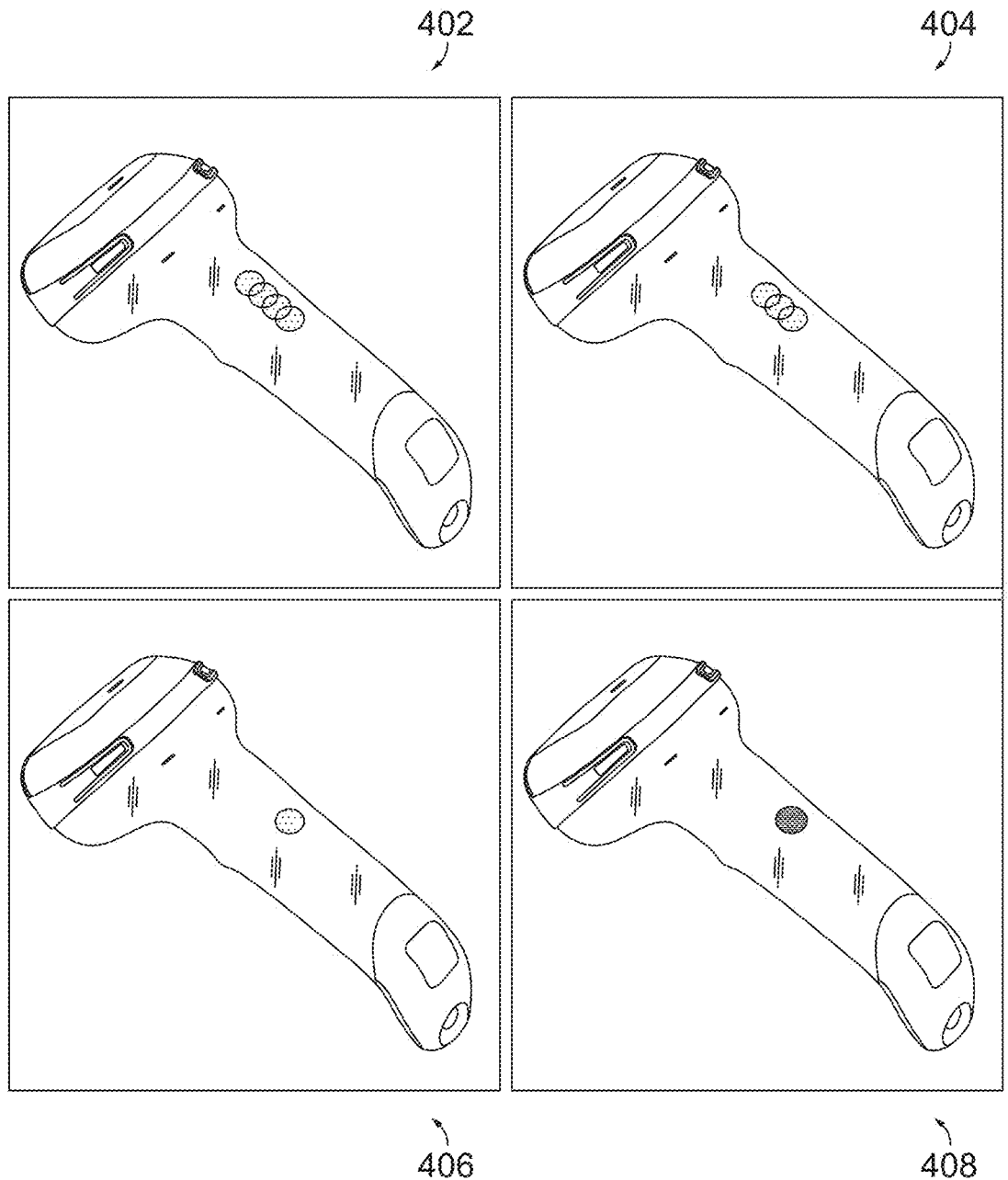
FIG. 4 illustrates example handheld scanning devices having the one or more battery indicators, in accordance with embodiments herein.

FIG. 4 depicts handheld scanning devices 402, 404, 406, and 408 having one or more battery indictors that emit visible light through an external portion of a back side of the handle. For example, the one or more battery indictors emit visible light through the external portion of the back side of the handle that has a material in which a visible light from the battery indicator(s) can pass through. Each of the handheld scanning devices 402, 404, 406, and 408 may have one or more battery indicators indicating a different state of the battery. By way of example, battery indicator(s) of handheld scanning device 402 may be indicating a fully charged state of the battery, battery indicator(s) of handheld scanning device 404 may be indicating a partially charged state of the battery (e.g., almost fully charged), and the battery indicator(s) of handheld scanning device 406 may be indicating a near-discharged state of the battery. As another example, battery indicator(s) of handheld scanning device 408 may be indicating an idle or standby state of the battery. In yet another example, battery indicator(s) of handheld scanning device 408 may be indicating a charging state of the battery (e.g., the battery is currently receiving electrical energy).

In an embodiment, the handle can be partially translucent or transparent in order to let wavelengths pass through the external part of the handle (e.g., the external enclosure that includes a plastic wall).

Example Flowchart

Having described the example embodiments discussed above of the presently disclosed technology, an example flowchart 500 is described below with respect to FIG. 5. Although the term "step" may be used herein to connote different elements of methods employed, this term should not be interpreted as implying any particular order among or between various steps herein disclosed unless and except when the order of individual steps is explicitly described.

Figure 5:
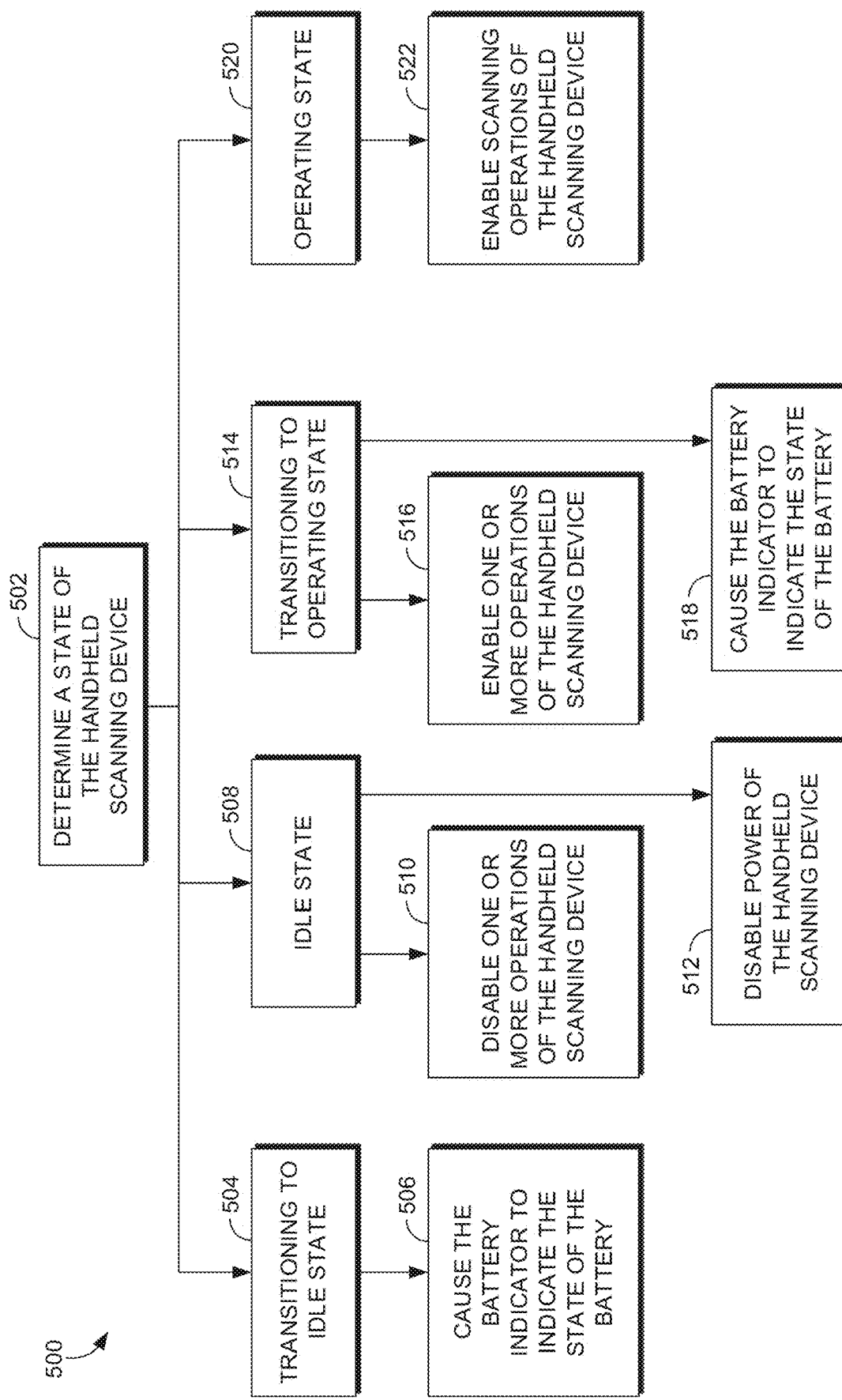
FIG. 5 illustrates an example flowchart for operations of the handheld scanning device, in accordance with embodiments herein.

As illustrated, FIG. 5 begins at step 502 with determining a state of a handheld scanning device (e.g., the handheld scanning device 100, 200, 402, 404, 406, or 408). For example, the optical sensor (e.g., optical sensor 108, 208, 616) and one or more processors of the handheld scanning device (e.g., processor(s) 604) can be used to determine that the handheld scanning device is transitioning to an idle state 504, that the handheld scanning device is in an idle state 508, that the handheld scanning device is transitioning to an operating state 514, or that the handheld scanning device is in an operating state 520. In some embodiments, one or more optical sensors can be used.

By way of example, the one or more optical sensors may be configured to measure a wavelength (e.g., IR, visible light, ultraviolet wavelengths, etc.) for object detection (e.g., detection of a human hand gripping the handle (e.g., handle 102, 202) of the handheld scanning device, detection of a palm of the human hand adjacent to the back side of the handle of the handheld scanning device, detection of a human hand adjacent to or applying pressure to the wavelength-penetrable portion of the external portion of the handle). In embodiments, the one or more optical sensors may be a photodiode or semiconducting device and one of the determinations (e.g., that the handheld scanning device is transitioning to an idle state 504, that the handheld scanning device is in an idle state 508, that the handheld scanning device is transitioning to an operating state 514, or that the handheld scanning device is in an operating state 520) can be made based on light detection by the photodiode or semiconducting device and measurements of generated current from the light. For example, the one or more processors can determine that the handheld scanning device is in an idle state 508 based on measuring generated current from the light being emitting through the back side of the handle and away from the photodiode or semiconducting device located on an internal handle portion of the handheld scanning device, without the presence of a palm of a human hand obstructing the light emission. As another example, the one or more processors can determine that the handheld scanning device is to transition to an operating state 514 based on the palm of the human hand obstructing or reflecting light away from the photodiode.

In embodiments, the one or more optical sensors may be a phototransistor and one of the determinations (e.g., that the handheld scanning device is transitioning to an idle state 504, that the handheld scanning device is in an idle state 508, that the handheld scanning device is transitioning to an operating state 514, or that the handheld scanning device is in an operating state 520) can be made based on current flow between a transistor and emitter of the phototransistor. For example, the one or more processors can determine that the handheld scanning device is to transition to an idle state 504 based on current flow between a transistor and emitter of the phototransistor and based on an absence of the palm of the human hand not causing an obstruction or reflection of light away from the phototransistor.

In embodiments, the one or more optical sensors may be an infrared (IR) sensor (e.g., a passive IR sensor that can detect heat from the human hand gripping the handle of the handheld scanning device, an active IR sensor that can detect IR wavelength reflections from the human hand gripping the handle of the handheld scanning device). For example, the one or more processors can determine that the handheld scanning device is in an operating state 520 based on absorbed, reflected, or scattered IR light, due to the palm of a human hand on the wavelength-penetrable portion of the external portion of the handle (e.g., external back side 104A), the IR light being emitted from the IR sensor and passing through the back side of the handle and towards the human hand (e.g., based on the scattering being detected over a threshold period of time).

In embodiments, the one or more optical sensors may be a time-of-flight sensor, and one of the determinations (e.g., that the handheld scanning device is transitioning to an idle state 504, that the handheld scanning device is in an idle state 508, that the handheld scanning device is transitioning to an operating state 514, or that the handheld scanning device is in an operating state 520) can be made based on the time it takes for a wavelength (e.g., an IR wavelength) emitted by the time-of-flight sensor to return to the time-of-flight sensor (e.g., based on the IR wavelength being absorbed, scattered, or reflected back towards the time-of-flight sensor). For example, the one or more processors can determine that the handheld scanning device is transitioning to an idle state 504 based on the round trip time. In some embodiments, one of the determinations can be made based on implementing multiple measurement points (e.g., 3D sensing) via the time-of-flight sensor. In some embodiments, the one or more processors can determine that the handheld scanning device is in an operating state 520 based on proximity sensing (e.g., using an IR LED emitter) of a human hand surrounding the handle (e.g., based on the human hand gripping the handle).

In embodiments, based on determining that the handheld scanning device is transitioning to an idle state 504 (e.g., using the optical sensor and one or more of an accelerometer of the handheld scanning device), one or more processors of the handheld scanning device (e.g., communicatively coupled with a battery (e.g., battery management circuitry) and battery indicator of the handheld scanning device) can cause the battery indicator (e.g., battery indicator 110, 618) to indicate a state of the battery at step 506. In some embodiments, the battery indicator is positioned on an internal portion of the handle (e.g., internal portion 106, 206) and under the external back side of the handle, the external back side of the handle having a material in which a visible light from the battery indicator can pass through. The one or more processors can detect a state of the battery and cause the battery indicator to emit the visible light through the external back side of the handle to indicate the state of the battery (see, e.g., FIG. 4).

In some embodiments, the one or more processors can determine that the handheld scanning device is to transition to the idle state 504 using one or more optical sensors that are additionally or alternatively positioned under two lateral sides of an external portion of the handle of the handheld scanning device (e.g., external lateral sides 204A, 204B), such that the external portion of the two lateral sides in which the optical sensors are positioned under are of a material in which wavelengths from the optical sensors can pass through. For example, the material may be transparent or translucent. In some embodiments, an optical sensor positioned under the one lateral side is a different type of optical sensor than the other optical sensor positioned under the other lateral side of the handle. In some embodiments, the material of one lateral side of the external portion of the handle is a different material than the material the other lateral side of the external portion of the handle.

In embodiments, based on determining that the handheld scanning device is in an idle state 508, one or more processors of the handheld scanning device can disable one or more operations of the handheld scanning device at step 510. By way of example, the operations that can be disabled may include one or more of reducing power consumption by the handheld scanning device by reducing processing power (e.g., for image acquisition and processing of the image data), implementing a sleep mode of the handheld scanning device, dynamically adjusting a power setting for the handheld scanning device, disabling the battery indicator, etc. Additionally, based on determining that the handheld scanning device is in an idle state 508, one or more processors of the handheld scanning device can disable the power of the handheld scanning device (e.g., after a threshold period of time) at step 512.

In embodiments, based on determining that the handheld scanning device is transitioning to the operating state 514 (e.g., using the optical sensor and one or more of an accelerometer of the handheld scanning device communicatively coupled with the one or more processors of handheld scanning device), one or more processors of the handheld scanning device can enable one or more operations of the handheld scanning device at step 516. For example, the operations that can be enabled may include one or more of scanner aiming, scanner illumination, activation of the scanner trigger, image acquisition, scanner autofocus and range operations, disable a sleep mode of the handheld scanning device, dynamically increase a power setting for the handheld scanning device, enable one or more battery indicators, etc. Additionally or alternatively, based on determining that the handheld scanning device is transitioning to the operating state 514, one or more processors of the handheld scanning device can cause the battery indicator to indicate the state of the battery at step 518. For example, the one or more processors can detect a state of the battery and cause the battery indicator to emit visible light (e.g., in a particular color) through the wavelength-penetrable back side of the handle to indicate the state of the battery. In some embodiments, the battery indicator can be positioned on an internal portion of the handle to emit visible light through a wavelength-penetrable external front side (e.g., external front side 104B) or lateral side of the handle.

In some embodiments, the detected state of the battery can include a fully charged state of the battery, a partially charged state of the battery, a near-discharged state of the battery, a charging state (e.g., the battery is currently receiving electrical energy), an idle or standby state of the battery (e.g., the battery is not actively supplying power), or another type of state of the battery. In some embodiments, the one or more processors can detect a state of health of the battery and cause the battery indicator to indicate the state of health of the battery. For example, the state of the health of the battery may be detected using a voltage measurement (e.g., an open-circuit voltage) of the battery and an expected voltage of the battery, a measured capacity of the battery and an original design capacity of the battery, a resistance measurement of the battery, a number of discharge cycles of the battery, the temperature of the battery for a period of time, historical battery usage patterns, a voltage discharge curve, other types of state of health parameters, or one or more combinations thereof.

In embodiments, based on determining that the handheld scanning device is in an operating state 520, one or more processors of the handheld scanning device can enable one or more scanning operations (e.g., scanner operations of scanning head 112, 212) of the handheld scanning device at step 522. For example, the scanning operations that can be enabled may include one or more of enabling a decoding task (e.g., a decoding algorithm that analyzes data captured by the scanner), enabling the transmission or storage of the decoded data, enabling one or more electrical connectors, enabling an error correction task (e.g., for partially damaged or obscured barcode symbols detected by the scanner), enabling the parsing of structured data (e.g., parsing GS1-formatted data), enabling the interpretation of modifiers or extensions, enabling one or more verification tasks (e.g., checksums or error-checking techniques to ensure accuracy), enabling optical character recognition, enabling RFID tag extraction, enabling management of variable-length data, enabling another type of scanning operation, or one or more combinations thereof.

In some embodiments, the one or more processors can determine that the handheld scanning device is in the operating state 520 using one or more optical sensors that are positioned under one or more of a front and lateral side of an external portion of the handle of the handheld scanning device, such that the external portion in which the optical sensors are positioned under is of a material in which wavelengths from the optical sensors can pass through. In some embodiments, an optical sensor positioned under a lateral side is a different type of optical sensor than the optical sensor positioned under the front side of the handle. In some embodiments, the material of one lateral side of the external portion of the handle is a different material than the material the front side of the external portion of the handle. In some embodiments, the material of the front side of the external portion of the handle in which wavelengths from the optical sensors can pass through is made of a recycled plastic.

Example Operating Environment

Figure 6:
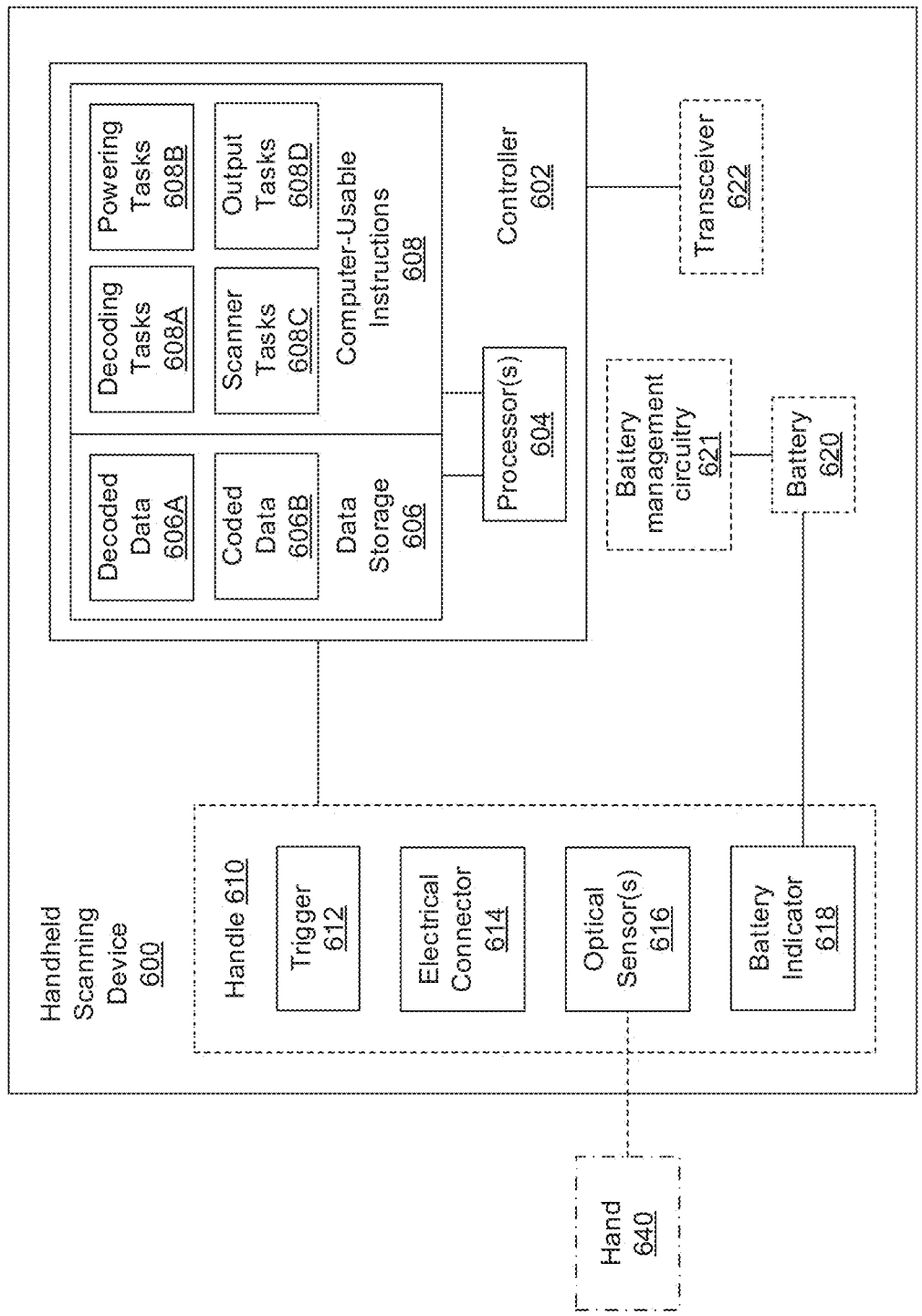
FIG. 6 depicts an example operational environment of the handheld scanning device, in accordance with embodiments herein.

Having described the example embodiments discussed above of the presently disclosed technology, an example operating environment for the handheld scanning device is described below with respect to FIG. 6. The example handheld scanning device 600 is but one example of a suitable computing environment and is not intended to be interpreted as having any particular dependency or requirement relating to any one or combination of components illustrated. By way of example, in other embodiments, the handheld scanning device 600 may have additional handle components 610 or one or more presentation components, such as a display.

Example handheld scanning device 600 has a controller 602 comprising processor(s) 604, computer-usable instructions 608 including decoding tasks 608A, powering tasks 608B, scanner tasks 608C, and output tasks 608D, and data storage 606 (volatile or non volatile memory) including decoded data 606A and coded data 606B; handle components 610 including trigger 612, electrical connector 614, optical sensor(s) 616, and battery indicator 618; battery 620; battery management circuitry 621, and transceiver 622.

The controller 602 may be a CPU, a microcontroller, a system-on-chip, a plurality of CPUs (e.g., configured based on advanced reduced instruction set computer architecture), another type of controller, or one or more combinations thereof. In embodiments, the controller 602 may include an application-specific integrated circuit, a logic unit, other types of circuitry, or one or more combinations thereof. The processor(s) 604 may be one or more of a digital signal processor, a processor core, a single-core processor, a dual-core processor, a multiple-core processor, a microprocessor, a host processor, a field-programmable gate array (e.g., capable of implementing parallel processing for decoding tasks or real-time data analysis), advanced reduced instruction set computer architecture Cortex-M series processors, x86 processors, image signal processors, another type of processor, or one or more combinations thereof.

The controller 602 may be communicatively coupled with the handle components 610 (including the trigger 612, the electrical connector 614, the optical sensor(s) 616, and the battery indicator 618), the battery 620; battery management circuitry 621, and the transceiver 622. In some embodiment the controller 602 can be positioned inside the handle 610. For example, the controller 602 can utilize the optical sensor(s) 616 for determining various states of the handheld scanning device 600 (e.g., an idle state, an operating state, a transitioning state (e.g., transitioning to the idle state, transitioning to the operating state)). For example, the controller 602 can utilize the optical sensor(s) 616 to detect a human hand 640 gripping the handle of the handheld scanning device 600. The optical sensor(s) 616 can be positioned at least one half of a centimeter under an external portion of the handle, the external portion being a material in which a wavelength from the optical sensor(s) 616 can pass through. By way of example, the material in which a wavelength from the optical sensor(s) 616 can pass through may be of at least a portion of a back side of the handle for detection of a palm of the human hand 640.

As another example, the controller 602 can utilize communications with the computer-usable instructions 608, data storage 606, handle components 610 (e.g., the battery indicator 618), and battery management circuitry 621 for detecting a state of the battery 620, for causing the battery indicator 618 to indicate the state of the battery 620 (e.g., by causing, using the battery management circuitry, the battery indicator 618 to emit visible light through the back side of the handle to indicate the state of the battery 620), and for enabling or disabling one or more operations of the handheld scanning device 600. For instance, the controller 602 can utilize the data storage 606 and the computer-usable instructions 608 (e.g., computer memory storing computer-usable instructions executable by the processor(s) 604) to cause the handheld scanning device 600 to perform these operations.

In embodiments, the decoded data 606A and coded data 606B may correspond to a barcode or quick-response (QR) code, including one or more of a Codabar, Code 25 (Interleaved), Code 25 (Non-interleaved), Code 11, Code 39, Code 93, Code 128, CPC Binary, DUN 14, EAN 2, EAN 5, EAN-8, EAN-13, Facing Identification Mark, GS1-128, GS1 DataBar, HIBC, Intelligent Mail barcode, ITF-14, JAN, KarTrak ACI, Latent image barcode, MSI, Pharmacode, PLANET, Plessey, PostBar, POSTNET, RM4SCC/KIX, Telepen, universal product code (UPC), Aztec Code, Code 1, ColorCode, Color Construct Code, CrontoSign, CyberCode, d-touch, DataGlyphs, Data Matrix, Datastrip Code, digital paper, EZcode, Color, High Capacity Color Barcode, HueCode, InterCode, MaxiCode, MMCC, NexCode, Nintendo e-Reader, Dotcode, PDF417, QR code, ShotCode, SPARQCode, another type of barcode or QR code, or one or more combinations thereof. In embodiments, the decoded data 606A and coded data 606B may correspond to RFID data associated with an RFID tag.

In embodiments, the decoding tasks 608A may include converting captured analog data or another type of data into digital data, the processing of captured barcode data (e.g., parallel lines, rectangular shapes, patterned dots), the decoding of captured sensor data, the conversion of captured three-dimensional image data into digital data, implementing a decoding algorithm to analyze data captured by the scanner, parsing of structured data (e.g., parsing GS1-formatted data), interpretation of modifiers or extensions, another type of decoding task, or one or more combinations thereof.

The powering tasks 608B may include one or more of adjusting a power setting for the electrical connector 614, dynamically adjusting a power setting for the battery 620, adjusting a power setting for the battery indicator 618, enabling or disabling the battery indicator 618, enabling or disabling the trigger 612, enabling or disabling an operation for the processor(s) 604, adjusting the clock speed of the processor(s) 604 or a speed in which the processor(s) 604 accesses the computer-usable instructions 608 or the data storage 606, enabling or disabling an operation for the controller 602, adjusting a power setting for the transceiver 622, charging the battery 620, adjusting an intensity of wavelengths emitted by the optical sensor(s) 616, another type of powering task 608B, or one or more combinations thereof.

The scanner tasks 608C may include one or more of an error correction task (e.g., for partially damaged or obscured barcode symbols detected by the scanner), optical character recognition, RFID tag extraction, management of variable-length data, verification tasks (e.g., checksums or error-checking techniques to ensure accuracy), scanner aiming, scanner illumination, scanner autofocus and range operations, management of scanning resolution of the scanner, another type of scanning operation, or one or more combinations thereof.

The output tasks 608D may include utilizing Wi-Fi or Bluetooth capabilities of the handheld scanning device 600 to transmit decoded data 606A and coded data 606B, operations for inventory management or point-of-sale operations, enabling the storage (e.g., within the computer-usable instructions 608 or data storage 606) of particular decoding tasks 608A, powering tasks 608B, scanner tasks 608C, output tasks 608D, decoded data 606A, or coded data 606B, transmitting the decoded data 606A and coded data 606B to an external device (e.g., a point-of-sale device) through the electrical connector 614 (e.g., of the handle), wirelessly transmitting (or transmitting via the electrical connector 614) particular decoding tasks 608A, powering tasks 608B, scanner tasks 608C, output tasks 608D, decoded data 606A, or coded data 606B, another type of output task, or one or more combinations thereof.

In embodiments, the trigger 612 may cause the scanner of the handheld scanning device 600 to capture coded data 606B (e.g., via a manual trigger). In embodiments, the trigger 612 may also cause the handheld scanning device 600 to perform one or more of the decoding tasks 608A, scanner tasks 608C, output tasks 608D, or one or more combinations thereof.

In embodiments, the battery 620 may be charged when electric power is provided to recharge the battery 620 (e.g., via a cable connected to the electrical connector 614). The battery 620 may be coupled to and provide electric power for operations of the handheld scanning device 600. In embodiments, the controller 602 can control the manner in which the battery 620 is recharged by an externally supplied electric power to prevent damage to the battery 620. The battery 620 may be a lithium-ion battery, a lithium-polymer battery, a nickel-metal hydride battery, an alkaline battery, an internal battery pack, a smart battery, another type of battery, or one or more combinations thereof.

The transceiver 622 may employ one or more of a radio frequency transmission, a transmission incorporated into an electromagnetic field by which electric power may be wirelessly conveyed, another type of wireless transmission, or one or more combinations thereof. In embodiments, the transceiver 622 may be configured associated with one or more standards (e.g., IEEE 802.11a, 802.11ad, 802.11ah, 802.11ax, 802.11b, 802.11g, 802.16, 802.20 (i.e. "Mobile Broadband Wireless Access"), Bluetooth, ZigBee, or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, another generation communication, another type of standard, etc., or one or more combinations thereof).

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A handheld scanning device comprising:
a handle having at least an external portion in which a wavelength can pass through;
an optical sensor located within the handle and aligned with the external portion so that the wavelength from the optical sensor can pass through;
one or more processors communicatively coupled with the optical sensor; and
computer memory storing computer-usable instructions that, when executed by the one or more processors, cause the handheld scanning device to perform operations comprising:
determining, using the optical sensor, whether the handheld scanning device is to transition to an idle state or an operating state;
upon determining that the handheld scanning device is to transition to the idle state, disabling one or more scanning operations of the handheld scanning device; and
upon determining that the handheld scanning device is to transition to the operating state, enabling one or more scanning operations of the handheld scanning device.

2. The handheld scanning device of claim 1, wherein the external portion is located on an external back side of the handle, which comprises the external back side and an external front side.

3. The handheld scanning device of claim 1, further comprising a plurality of optical sensors, including the optical sensor, located within the handle and aligned with the external portion so that wavelengths from each of the plurality of optical sensors can pass through, and wherein the external portion extends from an external back side of the handle, around two external lateral sides of the handle, and to an external front side of the handle, wherein the one or more processors is communicatively coupled with the plurality of optical sensors, wherein the computer-usable instructions, when executed by the one or more processors, cause the handheld scanning device to perform operations comprising:
determining, using the plurality of optical sensors, that the handheld scanning device is to transition to an operating state; and
based on determining that the handheld scanning device is to transition to the operating state, enabling one or more scanning operations of the handheld scanning device.

4. The handheld scanning device of claim 3, wherein the optical sensor is aligned with the external portion on the external back side of the handle, and wherein another optical sensor of the plurality of optical sensors is aligned with the external portion on the external front side of the handle.

5. The handheld scanning device of claim 4, wherein the handheld scanning device further comprises a battery and one or more battery indicators, the one or more battery indicators located within the handle and aligned with the external portion of the handle, such that visible light from the one or more battery indicators can pass through the external portion, the battery and the one or more battery indicators communicatively coupled with the one or more processors, and wherein the operations further comprise:
based on determining that the handheld scanning device is to transition to the operating state, detecting a state of the battery; and
causing the one or more battery indicators to emit the visible light through the external portion of the handle to indicate the state of the battery.

6. The handheld scanning device of claim 4, wherein the scanning device is configured to detect at least two parts of the hand surrounding the handle via the optical sensor and the another optical sensor.

7. The handheld scanning device of claim 6, wherein the at least two parts of the hand include a palm and a finger aligned with the respective optical sensor and the another optical sensor when a user is gripping the scanning device.

8. The handheld scanning device of claim 1, wherein a distance between the optical sensor and the external portion of the handle, in which the wavelength from the optical sensor can pass through, is at least one half of a centimeter.

9. The handheld scanning device of claim 1, wherein the external portion of the handle, in which the wavelength from the optical sensor can pass through, is a translucent material.

10. The handheld scanning device of claim 1, wherein the optical sensor includes one or more of a photodiode, a semiconducting device configured to convert wavelengths to an electrical current, a phototransistor configured to amplify generated current, an infrared (IR) sensor, a time-of-flight sensor, a light detection and ranging sensor, or a fiber optics sensor.

11. A handheld scanning device comprising:
a handle having at least an external portion in which a wavelength can pass through;
an optical sensor located within the handle and aligned with the external portion so that the wavelength from the optical sensor can pass through;
a battery and a battery indicator, the battery indicator positioned under the external portion of the handle, such that a visible light from the battery indicator can pass through the external portion;
one or more processors communicatively coupled with the battery indicator; and
computer memory storing computer-usable instructions that, when executed by the one or more processors, cause the handheld scanning device to perform operations comprising:
detecting a state of the battery; and
based on detecting the state of the battery, causing the battery indicator to emit the visible light through the external portion of the handle to indicate the state of the battery,
wherein the one or more processors are communicatively coupled with the optical sensor, and wherein the computer memory causes the handheld scanning device to perform the operations comprising:
determining, using the optical sensor, that the handheld scanning device is to transition to an idle state;
based on determining that the handheld scanning device is to transition to the idle state, disabling one or more scanning operations of the handheld scanning device; and
based on determining that the handheld scanning device is to transition to the idle state, disabling the battery indicator from emitting the visible light.

12. A method comprising:
determining, using one or more optical sensors and one or more processors of a handheld scanning device, that the handheld scanning device is to transition to an operating state, the one or more optical sensors located within a handle of the handheld scanning device and aligned with an external portion of the handle in which a wavelength from the one or more optical sensors can pass through; and
based on determining that the handheld scanning device is to transition to the operating state, enabling one or more scanning operations of the handheld scanning device,
wherein the handle has an external front side and an external back side, wherein the external portion is located on at least the external back side of the handle, and
wherein determining that the handheld scanning device is to transition to the operating state is further based on the one or more optical sensors being located within the handle and under the external back side of the handle of the handheld scanning device.

13. The method according to claim 12, wherein determining that the handheld scanning device is to transition to the operating state is further based on an accelerometer of the handheld scanning device, the accelerometer communicatively coupled with the one or more processors.

14. The method according to claim 12, wherein a second external portion, in which the wavelength from the one or more optical sensors can pass through, is located on the external front side of the handle, and wherein determining that the handheld scanning device is to transition to the operating state is further based on at least one of the one or more optical sensors being located within the handle, under the external front side of the handle, and aligned with the second external portion.

15. The method according to claim 12, further comprising:
based on determining that the handheld scanning device is to transition to the operating state, detecting, using the one or more processors, a state of a battery of the handheld scanning device, wherein the one or more processors are communicatively coupled to the battery; and
causing one or more battery indicators of the handheld scanning device to indicate the state of the battery.

16. One or more non-transitory computer storage media having computer-executable instructions embodied thereon, that when executed by at least one processor, cause the at least one processor to perform a method comprising:
determining, using one or more optical sensors and the at least one processor of a handheld scanning device, that the handheld scanning device is to transition to an idle state, the one or more optical sensors located within a handle of the handheld scanning device and aligned with an external portion of the handle in which a wavelength from the one or more optical sensors can pass through; and
based on determining that the handheld scanning device is to transition to the idle state, disabling one or more scanning operations of the handheld scanning device.

17. The one or more non-transitory computer storage media of claim 16, wherein the external portion extends from an external back side of the handle around two external lateral sides of the handle, and wherein determining that the handheld scanning device is to transition to the idle state is based on at least one of the one or more optical sensors being within the handle under each of the two external lateral sides and aligned with the external portion, and based on at least one of the one or more optical sensors being within the handle under the external back side and aligned with the external portion.

18. The one or more non-transitory computer storage media of claim 17, wherein the external portion is a transparent material.

19. The one or more non-transitory computer storage media of claim 17, wherein the optical sensors under each of the two external lateral sides are a different type of optical sensor than the at least one of the one or more optical sensors under the external back side.

20. The one or more non-transitory computer storage media of claim 16, wherein the at least one processor is caused to perform the method further comprising:
based on determining that the handheld scanning device is to transition to the idle state, disabling one or more battery indicators of the handheld scanning device, the one or more battery indicators located within the handle and aligned with the external portion of the handle.

* * * * *